(12) United States Patent
Hagel et al.

(10) Patent No.: US 6,896,001 B2
(45) Date of Patent: May 24, 2005

(54) SYSTEM AND KIT FOR DISPENSING REACTIVE TWO COMPONENT MATERIALS

(75) Inventors: Gerald W. Hagel, Lombard, IL (US); Scott Retterer, Ithaca, NY (US)

(73) Assignee: Simpson Strong-Tie Company, Inc., Dublin, CA (US)

(*) Notice: Subject to any disclaimer, the term of this patent is extended or adjusted under 35 U.S.C. 154(b) by 0 days.

(21) Appl. No.: 10/712,705

(22) Filed: Nov. 12, 2003

(65) Prior Publication Data

US 2004/0094217 A1 May 20, 2004

Related U.S. Application Data

(62) Division of application No. 09/912,878, filed on Jul. 24, 2001, now Pat. No. 6,737,000.

(51) Int. Cl.[7] ............................................. F16K 11/08
(52) U.S. Cl. .................. 137/625.47; 251/310; 141/325
(58) Field of Search ................... 137/625.47; 251/310; 222/484; 141/325, 344, 363

(56) References Cited

U.S. PATENT DOCUMENTS

| | | | |
|---|---|---|---|
| 170,576 A | 11/1875 | Malcolm | |
| 517,305 A | 3/1894 | Schlueter | |
| 874,876 A | 12/1907 | Taylor | |
| 965,129 A | 7/1910 | Walker | |
| 1,060,791 A | 5/1913 | Schaller | |
| 2,515,085 A | * 7/1950 | Hawk et al. ................. | 141/305 |
| 2,854,027 A | * 9/1958 | Kaiser et al. .......... | 137/625.41 |
| 3,036,819 A | 5/1962 | Peterson | |
| 3,140,078 A | 7/1964 | Krahe et al. | |
| 3,153,531 A | 10/1964 | Cook | |
| 3,164,303 A | 1/1965 | Trautmann | |
| 3,195,778 A | 7/1965 | Coates | |
| 3,378,035 A | * 4/1968 | Waddington et al. .. | 137/625.19 |
| 3,475,010 A | 10/1969 | Cook et al. | |
| 3,945,603 A | 3/1976 | Fraser | |
| 4,003,403 A | * 1/1977 | Nehring ................. | 137/625.41 |
| 4,200,478 A | 4/1980 | Jacino et al. | |
| 4,203,517 A | 5/1980 | Hildebrandt et al. | |
| 4,360,994 A | 11/1982 | Hodges | |
| 4,371,094 A | 2/1983 | Hutter | |
| 4,555,286 A | 11/1985 | Orikasa et al. | |
| 4,555,295 A | 11/1985 | Orikasa et al. | |
| 4,622,085 A | 11/1986 | Yamada et al. | |
| 4,787,186 A | 11/1988 | Irmscher | |
| 4,858,759 A | 8/1989 | Mauthe et al. | |
| 4,861,401 A | 8/1989 | Miura et al. | |
| 4,961,883 A | 10/1990 | Jacino et al. | |
| 4,976,285 A | * 12/1990 | Church et al. .............. | 137/588 |
| 4,986,862 A | 1/1991 | Matsufuru | |
| 5,039,016 A | * 8/1991 | Gunzel et al. .............. | 239/314 |
| 5,092,492 A | 3/1992 | Centea | |

(Continued)

FOREIGN PATENT DOCUMENTS

WO      WO 92/16707      10/1992

OTHER PUBLICATIONS

Svenic Australia, "Crack Injection Systems," Svenic Australia, (Caringbah, Australia), p. 1 & 2, published at least as early as Jul. 5, 2000.

*Primary Examiner*—John Fox
(74) *Attorney, Agent, or Firm*—James R. Cypher; Charles R. Cypher

(57) ABSTRACT

A rotary stop cock is formed so that in a first selected position it can separate a plurality of compartments, in a second selected position can allow for the flow of material from one or more upstream compartments into a downstream compartment, while also allowing air to vent from the downstream compartment through the stop cock and out to the atmosphere, and in another selected position can allow for the flow of material from what was the downstream compartment to what was the one or more upstream components without venting any of the compartments.

3 Claims, 14 Drawing Sheets

U.S. PATENT DOCUMENTS

| | | | |
|---|---|---|---|
| 5,155,965 A | 10/1992 | Tabei et al. | |
| 5,186,949 A | 2/1993 | Lai | |
| 5,213,265 A * | 5/1993 | Englhard et al. | 239/310 |
| 5,310,091 A | 5/1994 | Dunning et al. | |
| 5,350,084 A | 9/1994 | Miller et al. | |
| 5,370,221 A | 12/1994 | Magnusson et al. | |
| 5,433,354 A | 7/1995 | Jacobsen et al. | |
| 5,458,275 A | 10/1995 | Centea et al. | |
| 5,467,899 A | 11/1995 | Miller | |
| 5,535,922 A | 7/1996 | Maziarz | |
| 5,566,860 A | 10/1996 | Schiltz et al. | |
| 5,765,729 A | 6/1998 | Miller et al. | |
| 5,809,736 A | 9/1998 | Naito et al. | |
| 5,884,759 A | 3/1999 | Gueret | |
| 5,893,486 A | 4/1999 | Wasmire | |
| 5,944,226 A | 8/1999 | Schiltz et al. | |
| 5,951,160 A | 9/1999 | Ronk | |
| 5,984,152 A | 11/1999 | Jacobsen et al. | |
| 6,065,641 A | 5/2000 | Laguna Valderrama | |
| 6,074,582 A | 6/2000 | Jacino et al. | |
| 6,105,822 A | 8/2000 | Larsen et al. | |
| 6,129,249 A | 10/2000 | Jacobsen et al. | |
| 6,237,628 B1 * | 5/2001 | Miller et al. | 137/588 |
| 6,241,125 B1 | 6/2001 | Jacobsen et al. | |
| 2002/0101785 A1 | 8/2002 | Edwards et al. | |

* cited by examiner

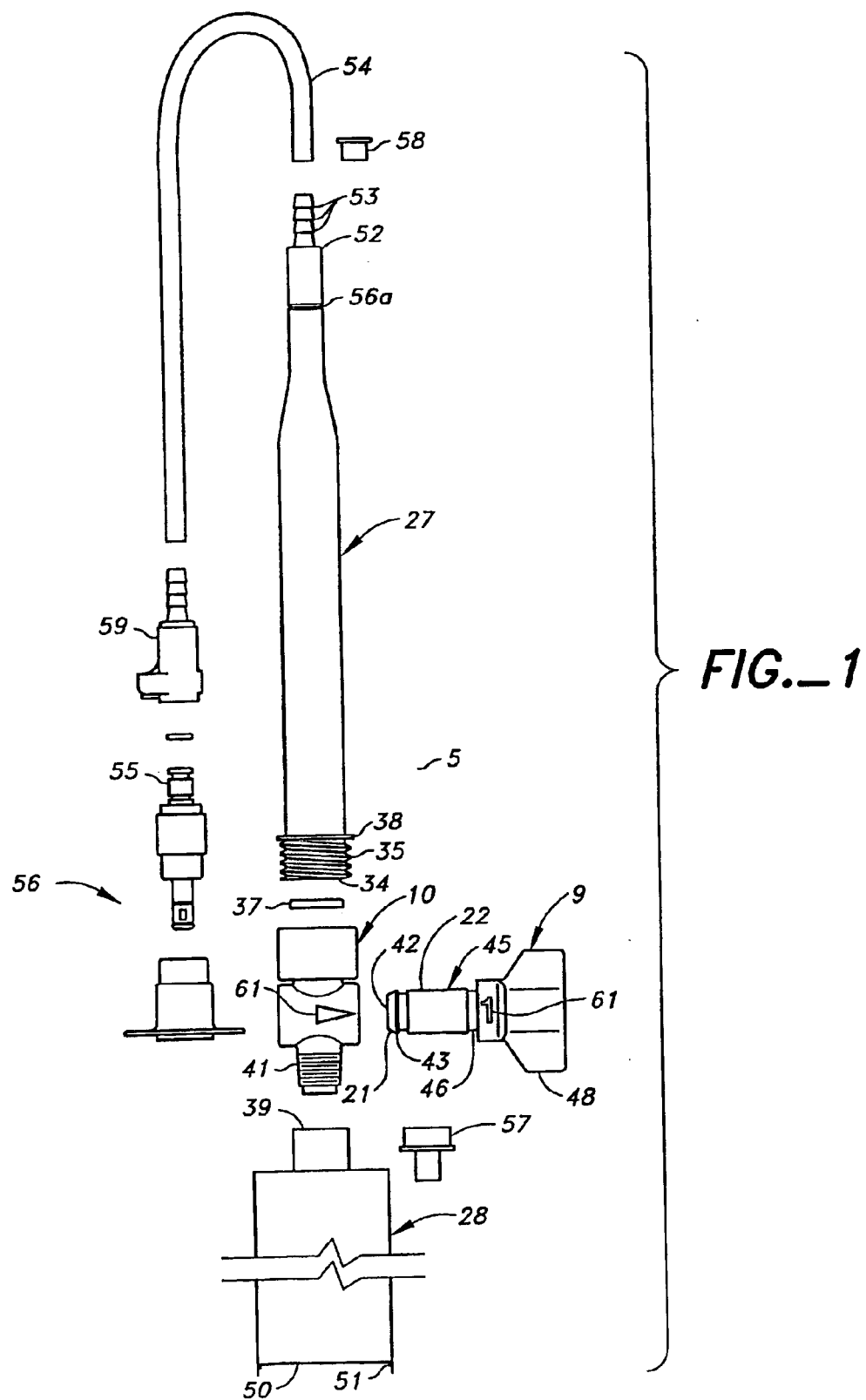
FIG._1

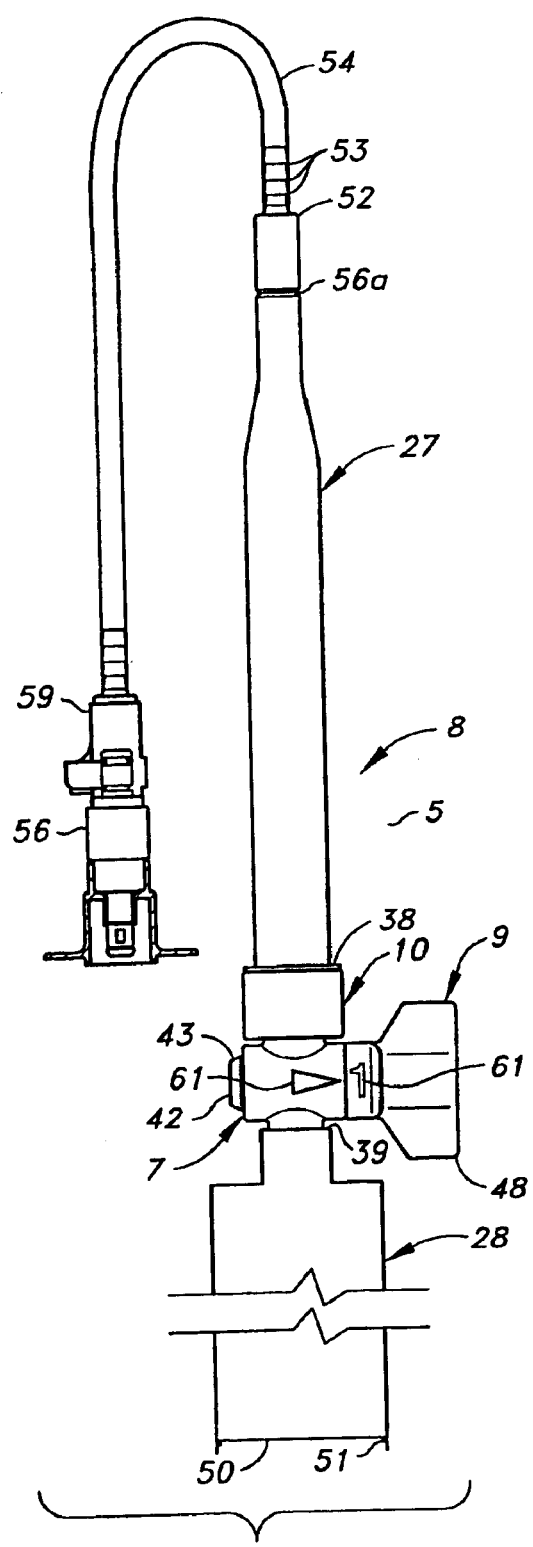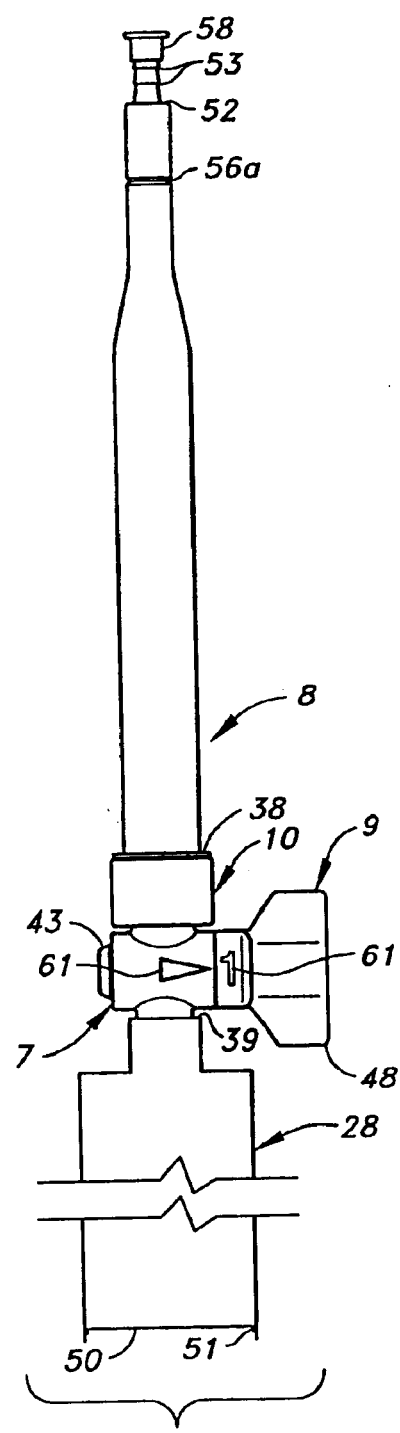
FIG _2A  FIG _2B

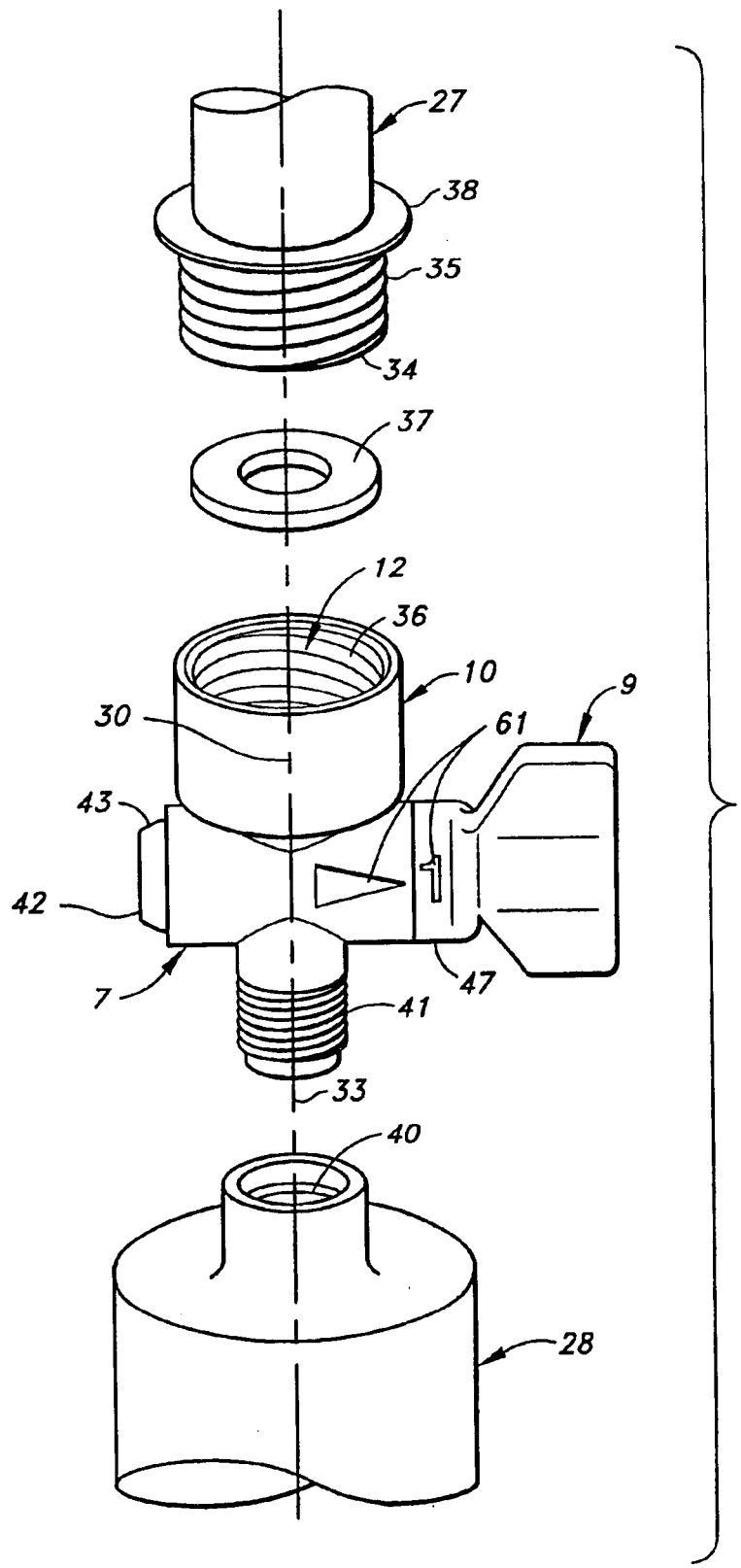
FIG._3

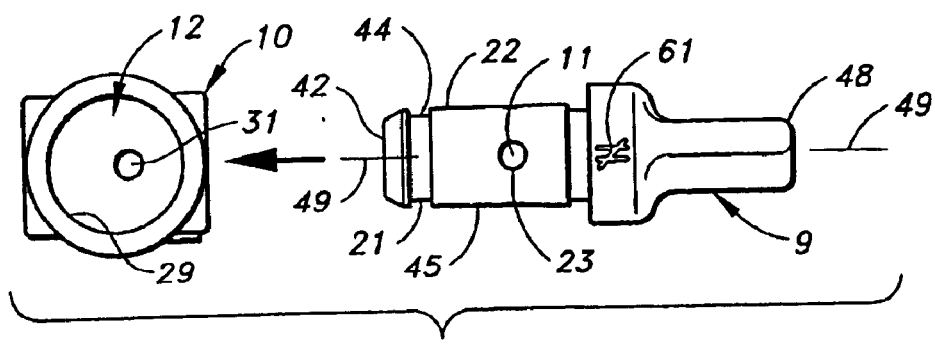
FIG._4A
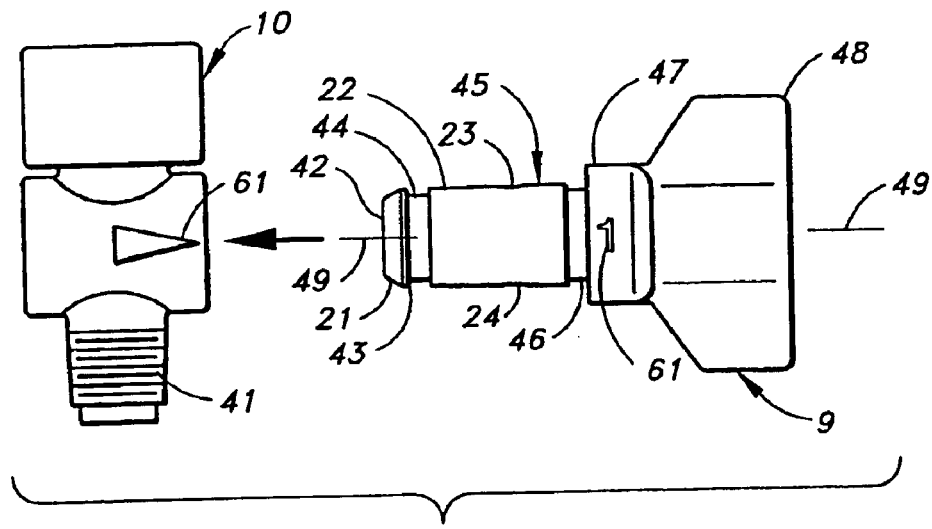
FIG._4B
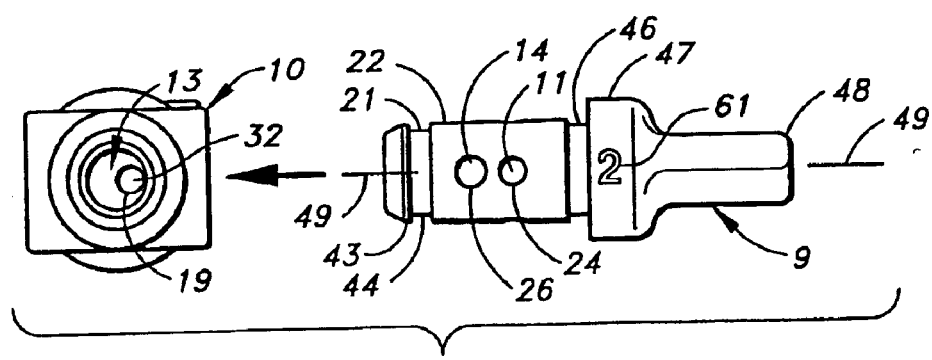
FIG._4C

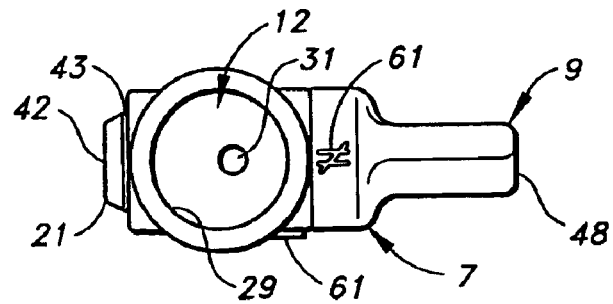
FIG._5A
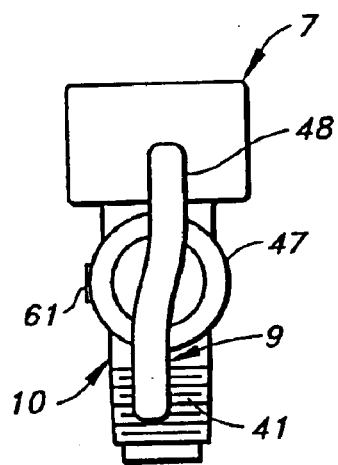
FIG._5B
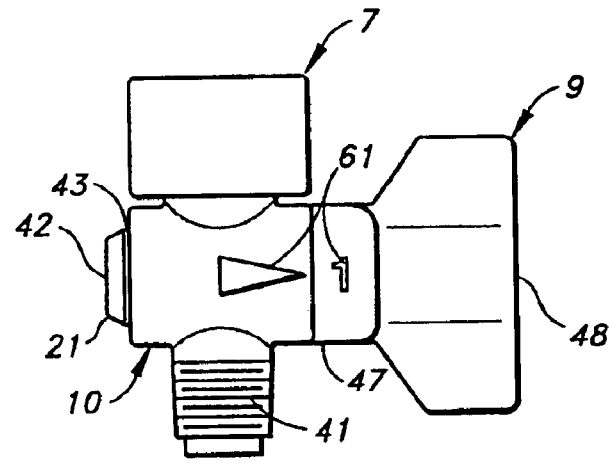
FIG._5C
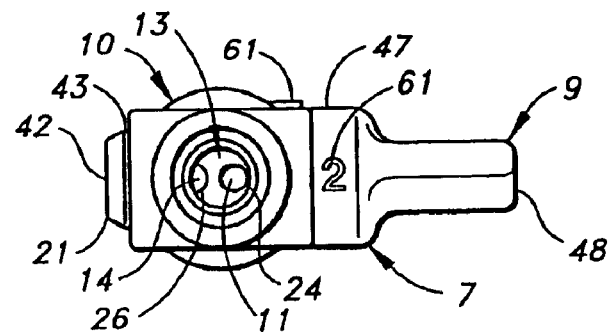
FIG._5D

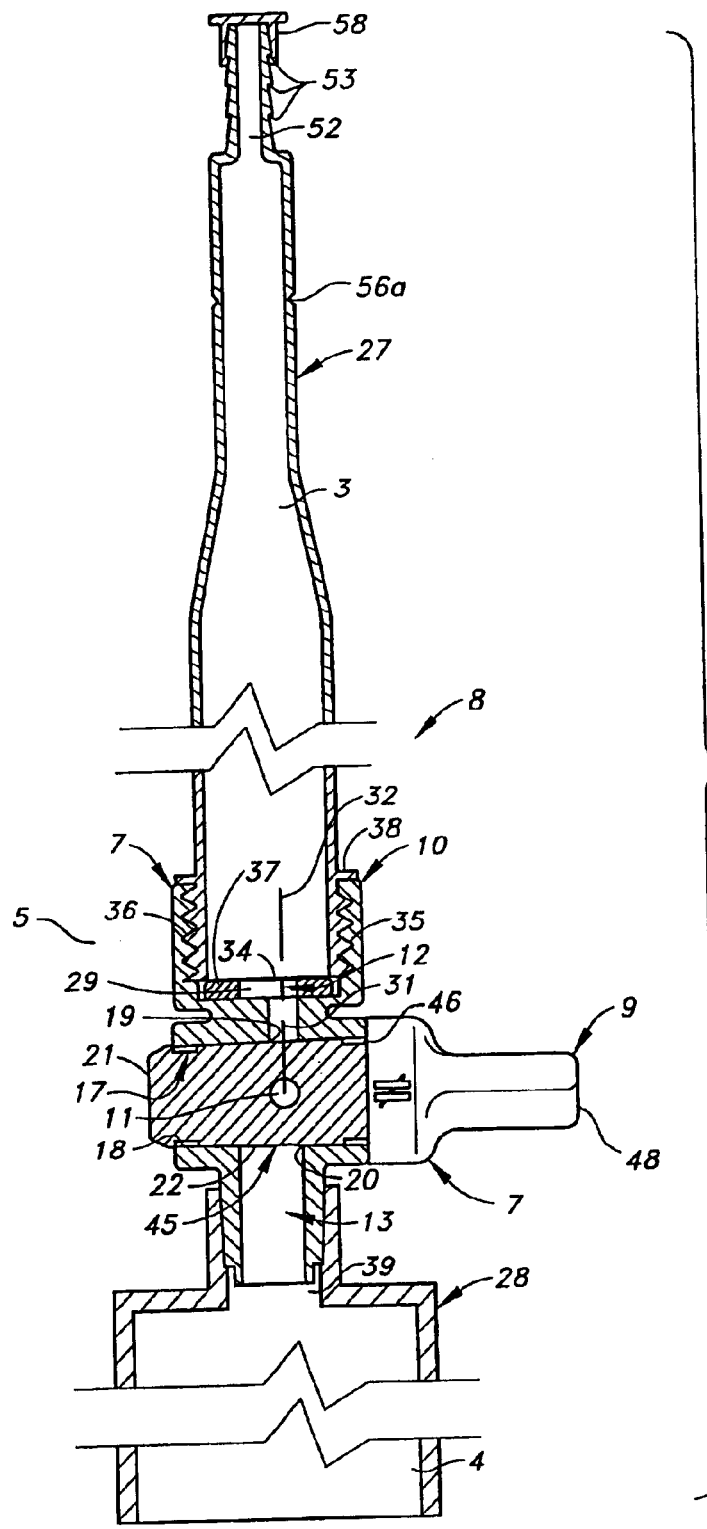
FIG._6

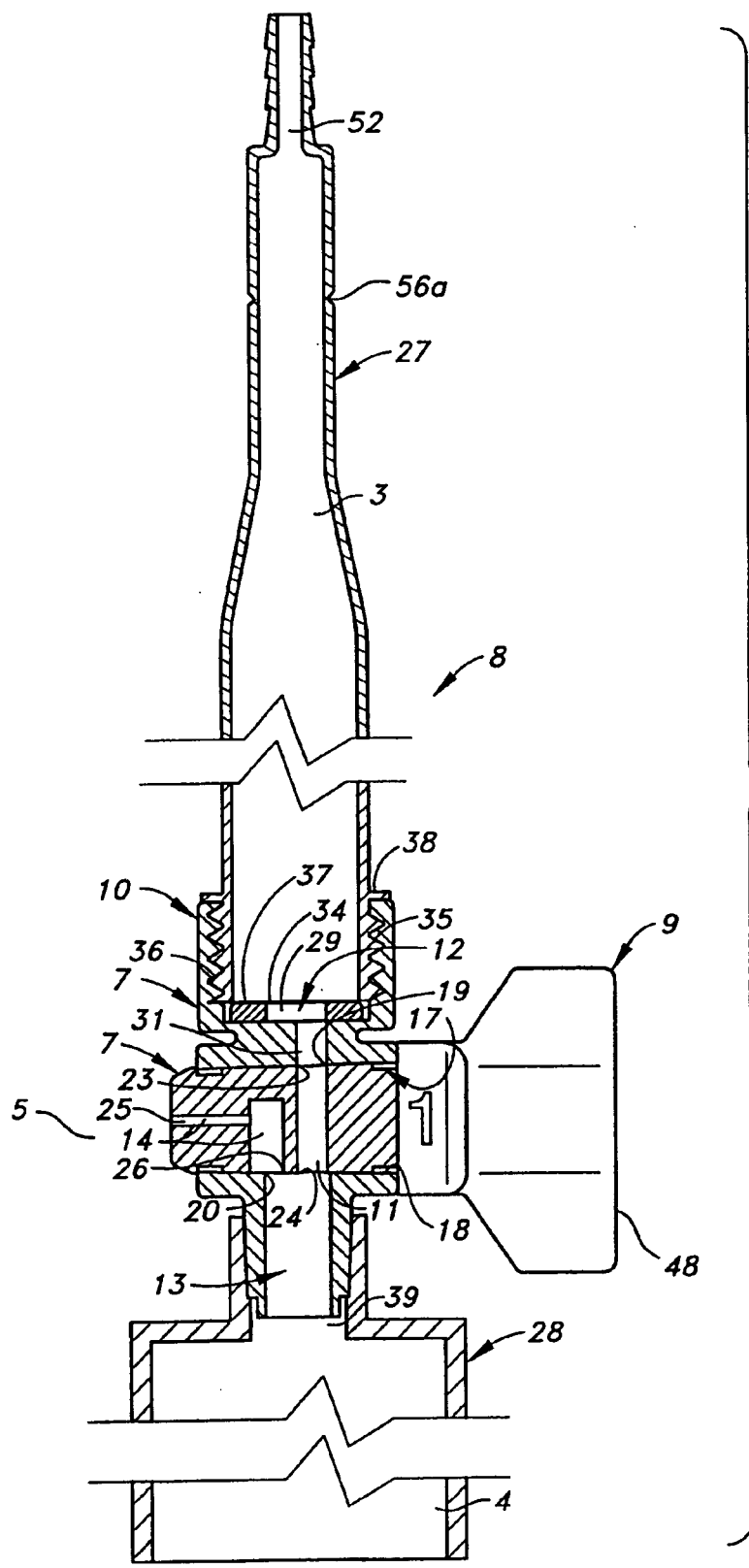
FIG._7

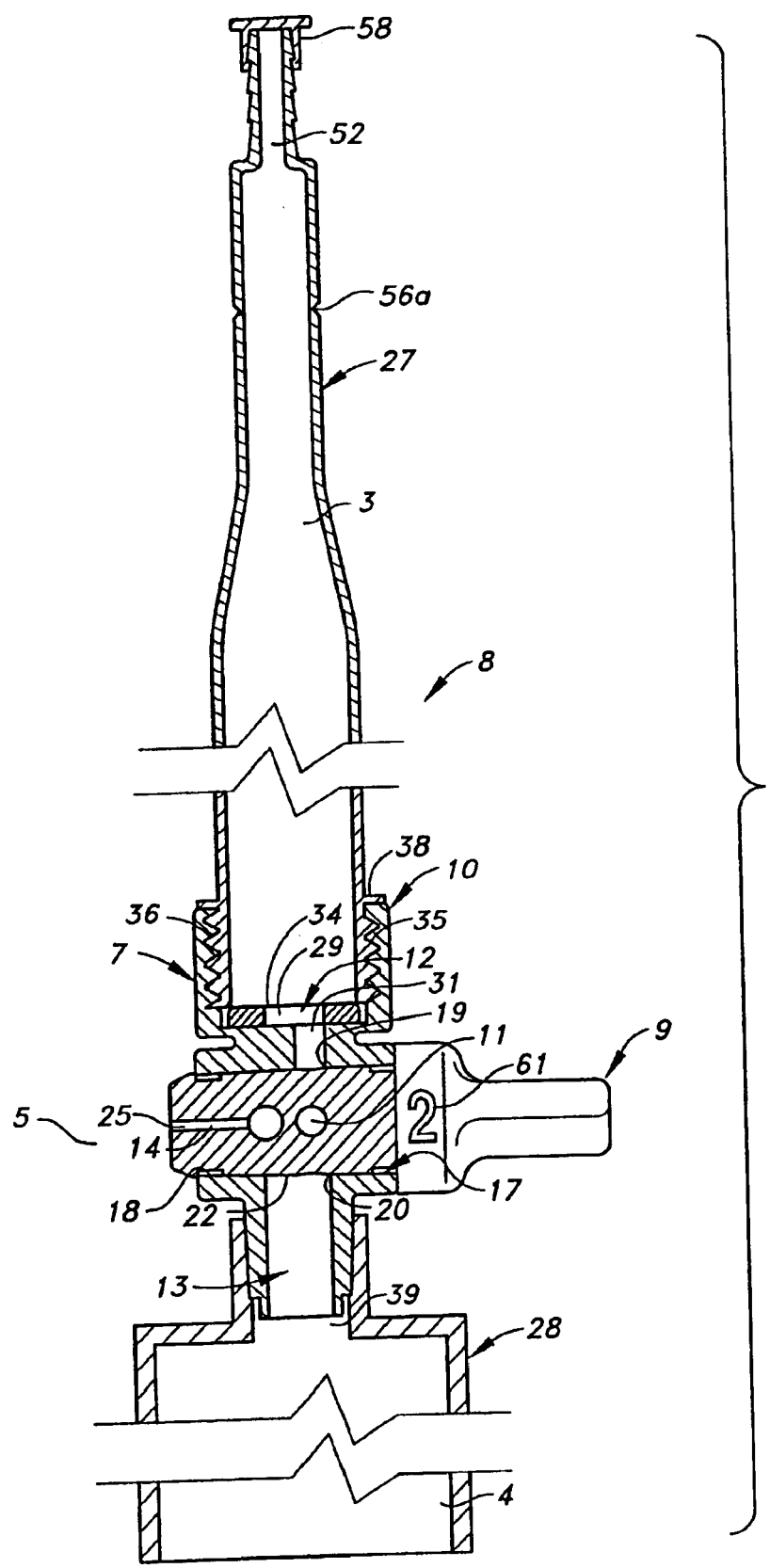
FIG._8

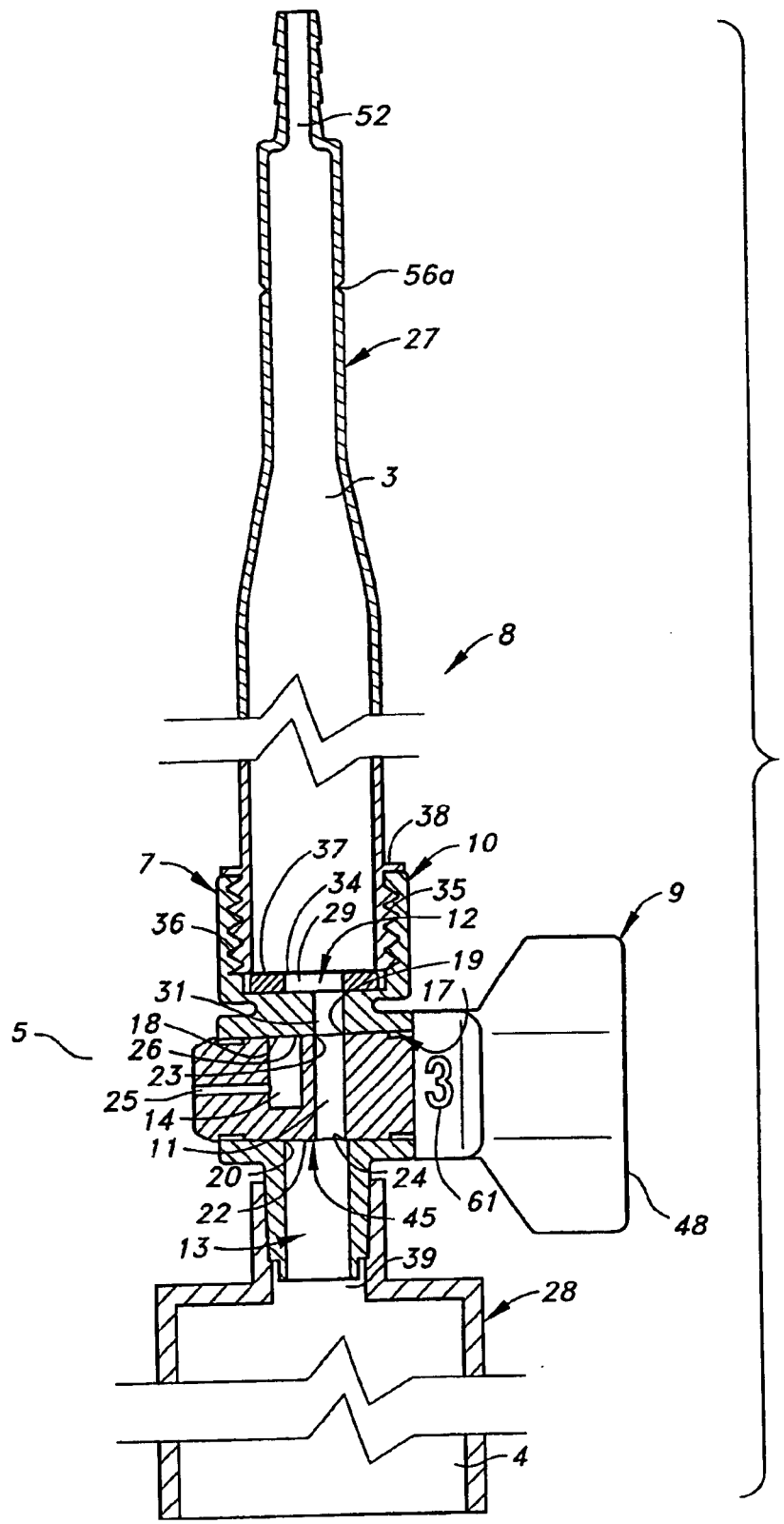
FIG._9

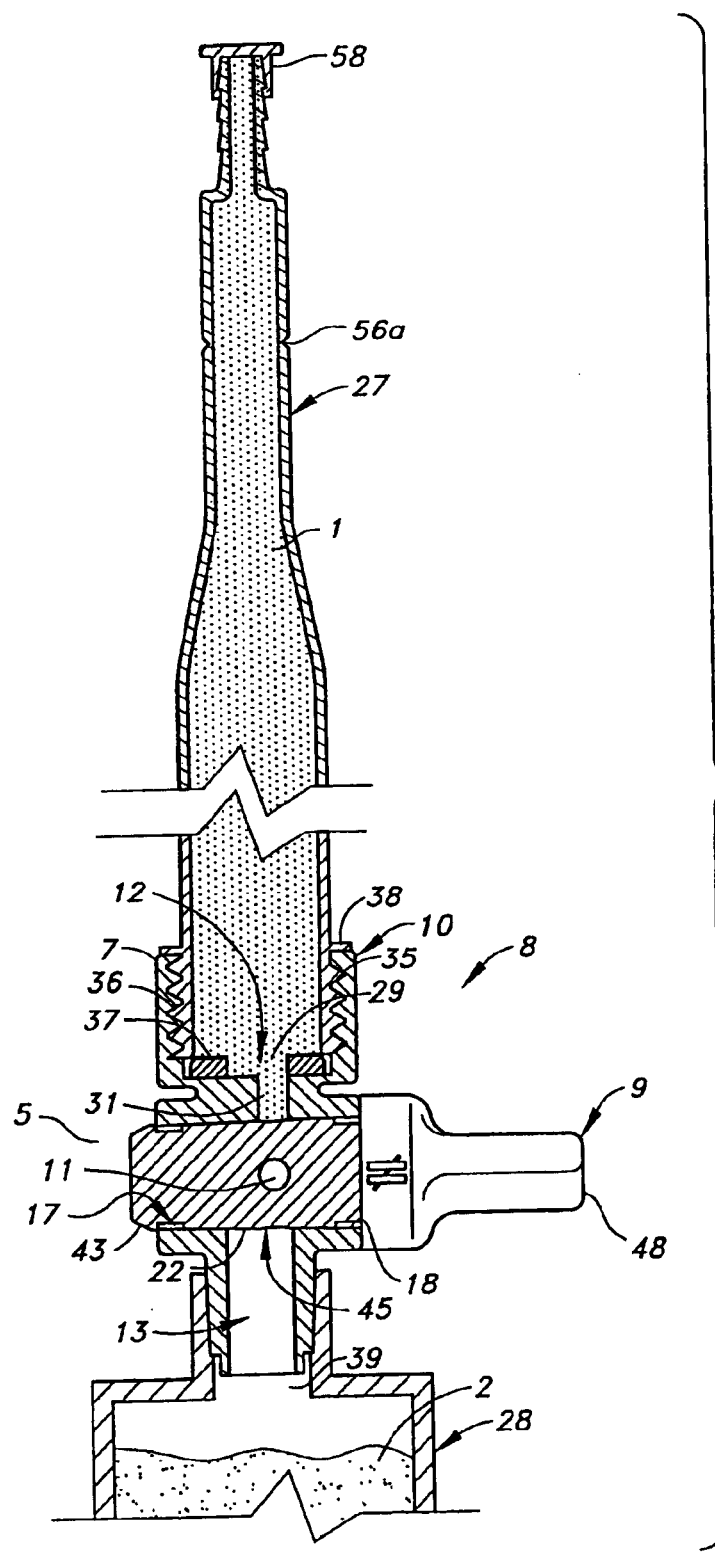
FIG._10

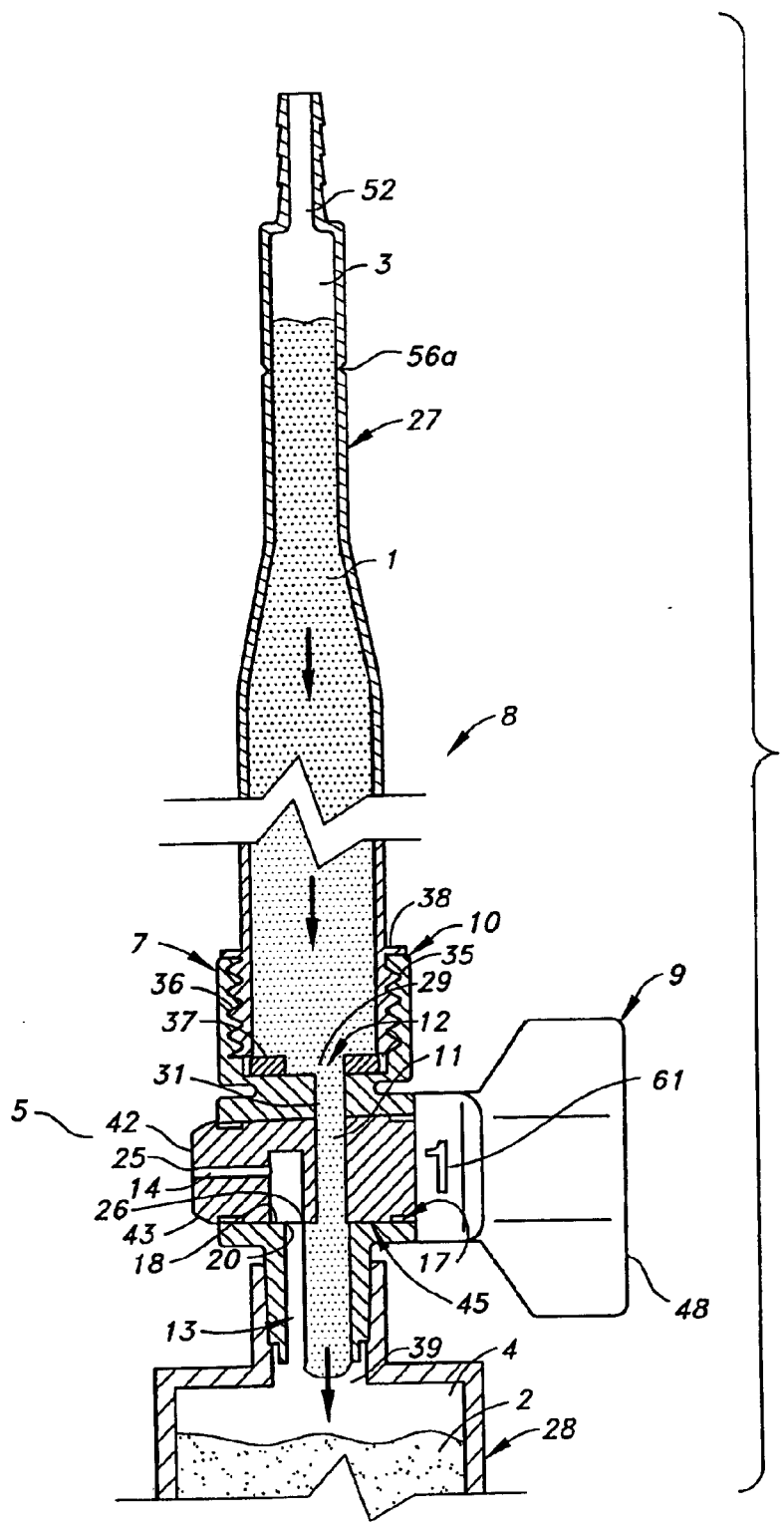
FIG._11

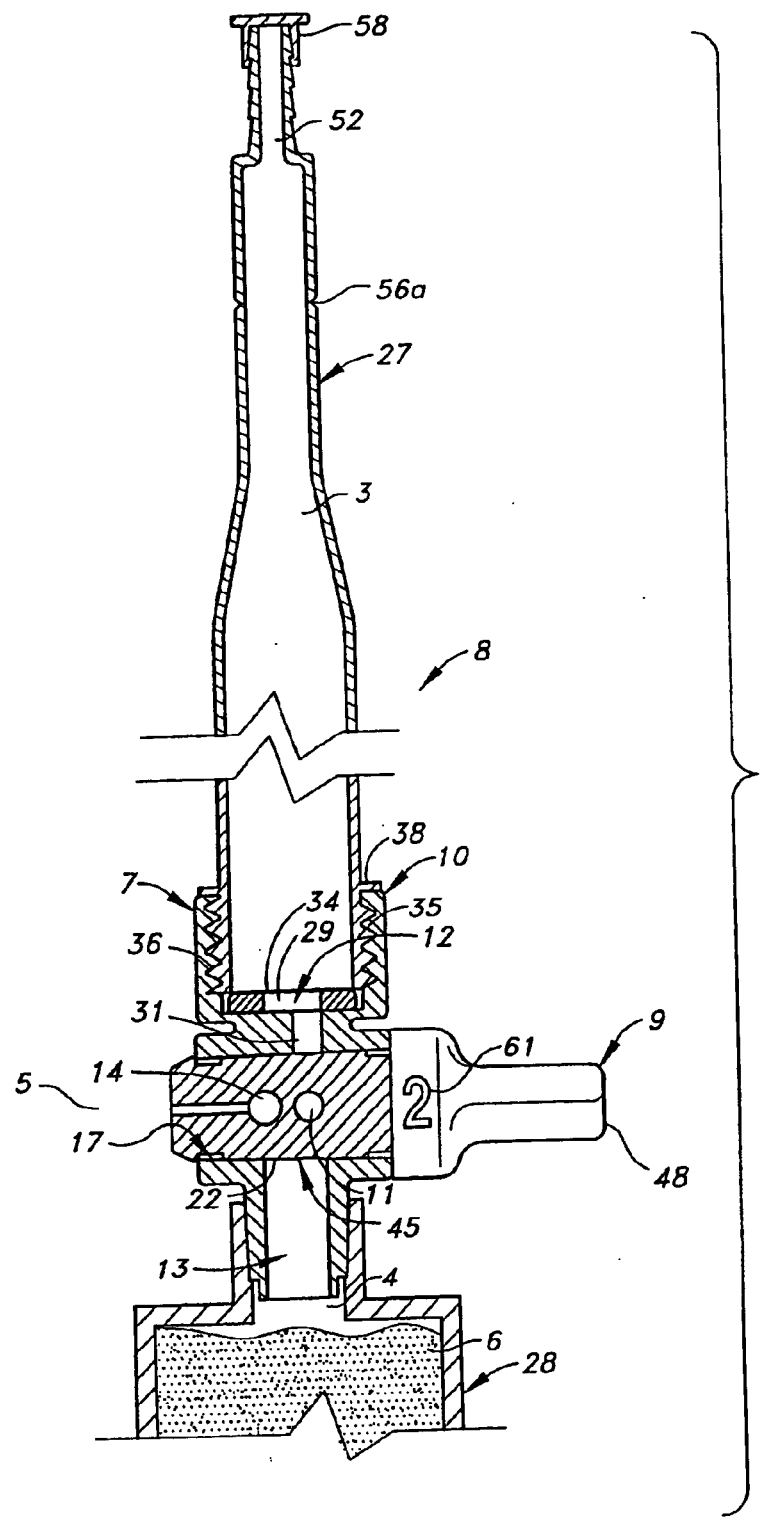
FIG._12

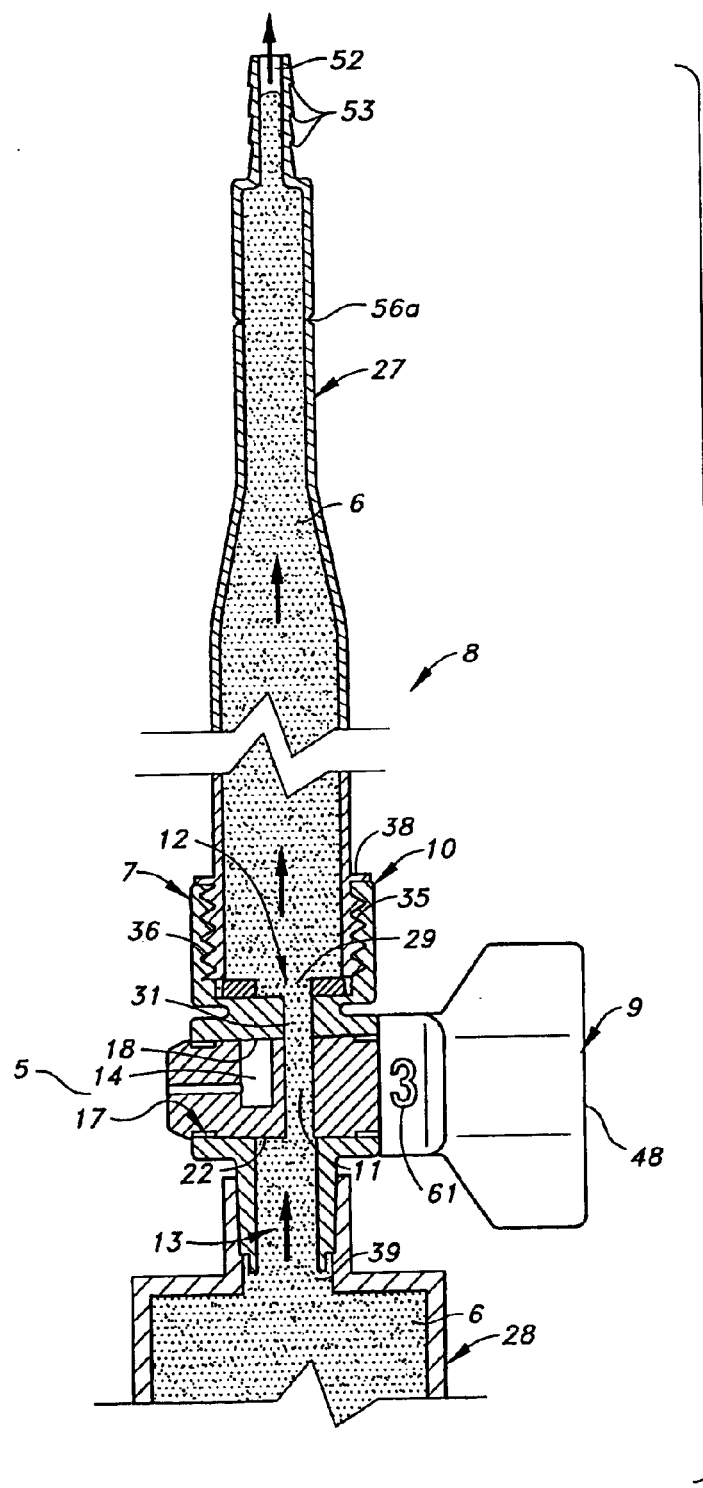
FIG._13

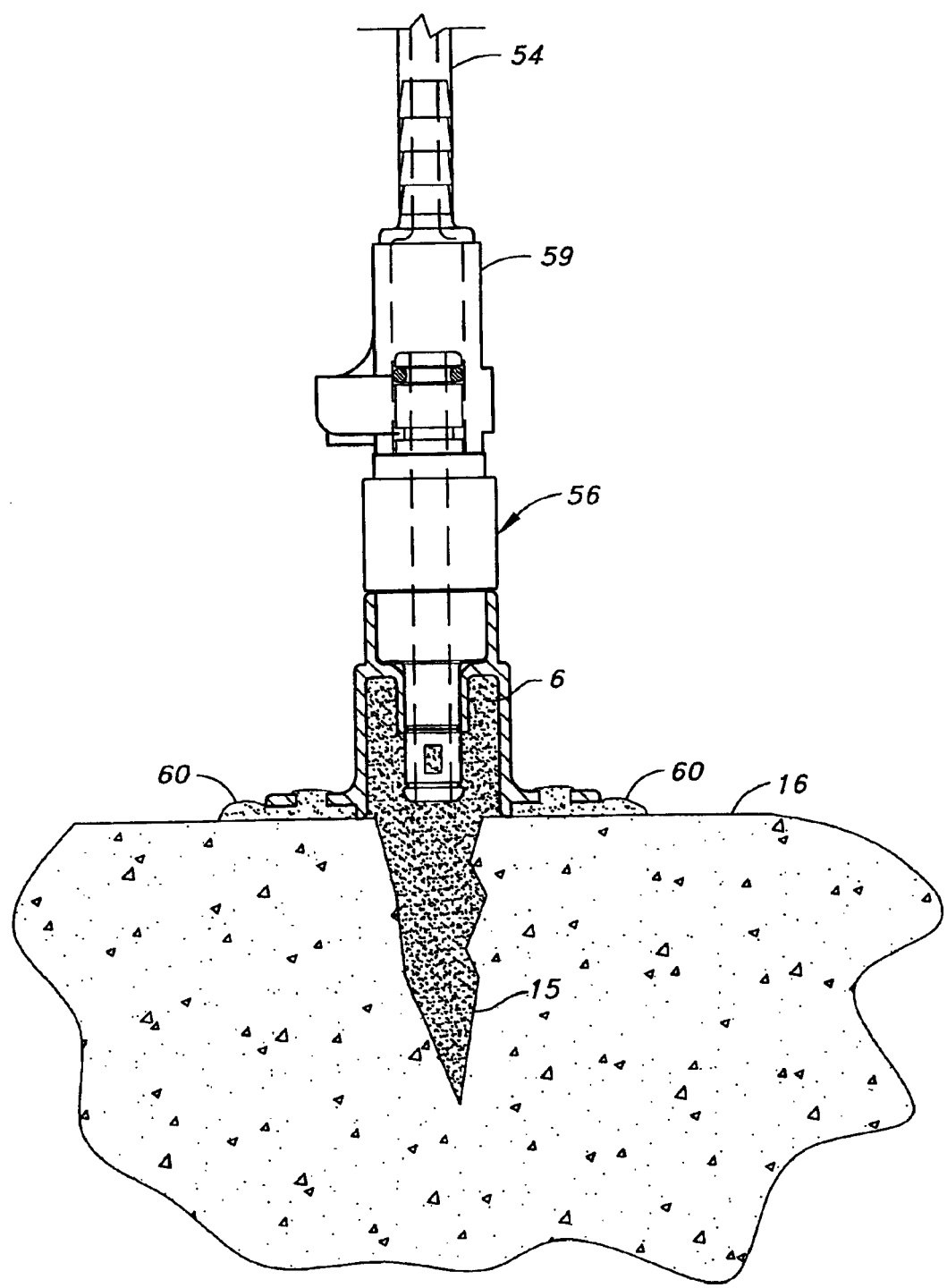
FIG_14

SYSTEM AND KIT FOR DISPENSING REACTIVE TWO COMPONENT MATERIALS

CROSS-REFERENCES TO RELATED APPLICATIONS

This application is a divisional application of application Ser. No. 09/912,878, filed Jul. 24, 2001, now U.S. Pat. No. 6,737,000, issued on May 18, 2004.

BACKGROUND OF THE INVENTION

This invention relates to a device that can keep two reactive components separate, during storage, and then easily allow for the mixture of the components when the components are ready to be used.

This invention has particular use in storing, mixing and then dispensing a two-component compound that is particularly suited for injection into and the repair of a surface crack in a concrete structure.

FIELD OF THE INVENTION

There are many materials which, when mixed with selected materials, become a strong bonding agent. Examples of these compounds include urethanes, polyester-based adhesives, epoxies, caulking compounds and grout. Many of these compounds are quick setting which means there is only a limited amount of time after the component materials have been mixed to apply them before they harden and can no longer serve as bonding agent. Thus, many of these compounds must be mixed and used in small quantities at a time. Furthermore, many of these compounds require that their separate component materials be combined in precise ratios in order to achieve the desired bonding and flow characteristics.

Because these materials, like the resin and hardener that form epoxy, may be costly, there has long been a demand for containers that hold separate precisely measured quantities of materials, and provide means for mixing and extruding them cleanly and quickly. A number of such containers have been produced, varying in form according to the nature and amounts of the stored materials, the qualities of the compound, the cost of manufacture, ease of assembly, ease of use, and the method of using them.

One common type of container is a tubular cartridge which has an outlet nozzle at one end and an opposite open end that is closed by a wiper slidably seated against the inside face of what is typically a cylindrical wall of the cartridge. The material is discharged from the outlet nozzle by advancing the wiper through the cartridge toward the nozzle. Available dispensing tools utilize a plunger connected to a rod, and a device that forces the rod and plunger axially into the open end of the cartridge and against the wiper. Available dispensing tools may be manually power or pneumatically powered.

One common multiple component fluid material system uses two or more cartridges from which the separate components forming the material are simultaneously discharged in the precise ratio needed to form the intended composite material, the discharged components being blended together in an elongated mixing/dispensing nozzle before being discharged as the composite material from the outlet end of the dispensing nozzle.

Another common multiple component fluid material system uses only one cartridge, but places barriers in the cartridge that can be ruptured, allowing for the mixture of the components prior to their use.

One approach adopted by the prior art provides a container with a barrier that at the time of use can be ruptured or distorted so that it no longer serves as a barrier. The barrier is ruptured or distorted by the action of a separate mixing member or dasher also located in the container which is attached to a rod that communicates to the outside. U.S. Pat. No. 3,153,531, granted Oct. 20, 1964 to Ralph. J. Cook uses a delicate foil barrier to create two compartments in a cylindrical container. When the materials are to be mixed the foil barrier is distorted allowing communication of the materials between the barrier. U.S Pat. No. 3,475,010, granted Oct. 28, 1969 to Ralph J. Cook and Clifford C. Moline, teaches using a foil barrier that is pierced by the mixing rod attached to the dasher or mixing member. The use of a delicate foil membrane as the barrier requires special provisions to avoid disrupting the barrier during the filling process. U.S. Pat. No. 3,195,778, granted Jul. 20, 1965 to J. Edwin Coates, teaches a more solid partition that is ruptured by severing means formed on the dasher or mixing member. Providing the dasher or mixing member with severing means sharp enough to rupture the more solid partition adds expense to its manufacture.

Another approach has been to provide the container with a multi-component assembly that can serve as a barrier or as a mixer depending upon the orientation and relative positions of its components. Some of the prior art patents in this category also share the further characteristic that the components can be joined together after mixing to serve as a piston or wiper.

An early example of this type of barrier is U.S. Pat. No. 3,140,078, granted Jul. 7, 1964 to Donald C. Krahe. It employs a pair of disks held together in close registration with corresponding openings so that the rotation of one disk exposes or occludes the corresponding openings in the other disk, thereby permitting or preventing the intermixing of the materials separated by the disks. Because the mere act of rotation of one disk with respect to the other either opens or closes the barrier between the two compartments, the user must be careful to avoid inadvertently opening or closing the barrier at the wrong time.

U.S. Pat. No. 3,164,303, granted Jan. 5, 1965 to Herbert L. Trautmann, is another such patent. Trautmann ('303) teaches forming a partition with a central bore that is releasably sealed by a dasher formed with a central boss. Similar to Krahe ('078), the user has to be careful about inadvertently reconnecting the dasher to the partition. Further, the partition is only provided with a single orifice that for the most part is blocked by the boss of the dasher when the partition is moved back to allow the combining of the materials. This slows the step of combining the materials.

U.S. Pat. No. 4,371,094, granted Feb. 1, 1983 to Charles G. Hutter III, in a manner similar to Trautmann ('303), teaches a sealing member formed with a central sleeve orifice sealed by the central core of a dasher member. Hutter III ('094) attempts to address the problem of inadvertent reattachment of the dasher and the sealing member while also providing for the reattachment of the dasher member to the sealing member following the mixing operation. Hutter III ('094) accomplishes this but only by requiring that the operating rod be inserted into the dasher at various selected distances at different points in its use, requiring precise operations by the user. Further, the sealing member of Hutter III ('094), like Trautmann ('303), is also only formed with a single orifice that is mostly blocked by the central core of the dasher when the sealing member is moved to the end of the cylinder, slowing down the combining of the materials.

A very important application for two-part filler component systems is the filling of surface cracks in concrete structures to restore structural integrity. To fill such cracks, a multiple-component crack injection material is used which typically has a low viscosity and is highly reactive. As such, many prior art devices are not suitable as means for separately storing the multiple components for extended periods of time.

Often, in such applications, special conduit routing structures are used in combination with the dispensing cartridge for more accurately directing the discharged material to the intended region of use.

One such routing structure is a tubular surface port, which has an outlet end with an enlarged base that can be bonded by adhesive to the structure's surface with the tube bore aligned over a surface crack. The outlet nozzle of the material dispensing cartridge is then placed in communication with the inlet end of the surface port device, and the dispensing tool is actuated to force material out of the dispensing cartridge, through the surface port device and into the crack.

It is also common to use a flexible extension hose to connect the outlet end of the dispensing cartridge to the inlet end of the surface port.

Typically, when long cracks in a concrete structure are to be filled a number of tubular surface ports are used along the length of the crack. The surface ports are positioned over the crack and adhered to the concrete structure with a surface adhesive. Between the ports the crack is covered with a sealing compound such that when the filler material is discharged into the crack through the surface ports, it will not escape from the crack, but be forced into the crack.

Once the adhesive securing the surface ports has properly set and the sealing compound has cured, the two-component filler material is mixed together. Then the dispensing cartridge is connected to a first, selected surface port and filler material is discharged into the crack through the surface port, until the back pressure prevents further operation of the dispenser. The port is then sealed, either automatically or by some operation by the user, the dispenser is disconnected from the surface port and reconnected to the next surface port along the crack, and more filler material is injected into the crack.

SUMMARY OF THE INVENTION

The present invention provides a rotary stop cock that in a first selected position can separate a plurality of compartments, in a second selected position can allow for the flow of material from one or more upstream compartments into a downstream compartment, while also allowing air to vent from the downstream compartment through the stop cock and out to the atmosphere, and in another selected position can allow for the flow of material from what was the downstream compartment to what was the one or more upstream components without venting any of the compartments.

The present invention also provides a method of separately storing a plurality of component materials that are to be combined in upstream and downstream compartments, combining them in a downstream compartment while allowing atmosphere to vent from the downstream compartment to the outside atmosphere, and then moving the combined material from the downstream compartment to the upstream compartment without allowing the combined material to escape to the outside atmosphere until desired.

The stop cock of the present invention serves as an effective barrier during storage of the materials. It also allows the materials to be safely combined and mixed when they are ready to be used.

It is economical to produce, and it is simple to use.

BRIEF DESCRIPTION OF THE DRAWINGS

FIG. 1 is an exploded side elevation view of a kit made according to the present invention for filling cracks in concrete. The tubular cartridge, a stop cock and dispensing nozzle of the present invention are shown as well as additional components of the kit.

FIG. 2A is a side elevation view of a kit made according to the present invention for filling cracks in concrete. A portion of the tubular surface port used in the kit is shown in cross-section.

FIG. 2B is a side elevation view of the tubular cartridge, stop cock and dispensing nozzle joined together. The dispensing tip or outlet end of the dispensing nozzle is shown closed by a cap.

FIG. 3 is a partially exploded perspective detail of the apparatus of the present invention. The stem of the stop cock is shown situated in the body.

FIG. 4A is an exploded top view of the stem and body of the present invention. The stem is oriented with respect to the housing as it would be when material from the dispensing nozzle is meant to be flowing into the tubular cartridge and atmosphere is venting from the tubular cartridge.

FIG. 4B is an exploded side view of the stem and body of the present invention. The stem is oriented with respect to the body in the same manner as shown in FIG. 4A.

FIG. 4C is an exploded bottom view of the stem and body of the present invention. The stem is oriented with respect to the body in the same manner as shown in FIGS. 4A and 4B.

FIG. 5A is a top view of the stem and body of the present invention. The stem is shown inserted into and oriented with respect to the body as it would be when material from the dispensing nozzle is meant to be flowing into the tubular cartridge and atmosphere is meant to be venting from the tubular cartridge.

FIG. 5B is an end view of the stem and body of the present invention. The stem is oriented with respect to the body in the same manner as shown in FIG. 5A.

FIG. 5C is a side view of the stem and body of the present invention. The stem is oriented with respect to the body in the same manner as shown in FIGS. 5A and 5B.

FIG. 5D is a bottom view of the stem and body of the present invention. The stem is oriented with respect to the body in the same manner as shown in FIGS. 5A, 5B and 5C.

FIG. 6 is cross-sectional side elevation view of the dispensing nozzle, stop cock, and tubular cartridge as they would appear when joined together. The stop cock is oriented to prevent communication between the dispensing nozzle and the tubular cartridge. In the preferred embodiment, this is the position for the stop cock prior to any combining of the materials.

FIG. 7 is a similar view to FIG. 6, except the stop cock has been rotated clockwise a quarter turn. In this position the stop cock allows for communication between the dispensing nozzle and the tubular cartridge, and venting of the tubular cartridge. In the preferred embodiment, this is the position for the stop cock for combining materials.

FIG. 8 is a similar view to FIGS. 6 and 7, except the stop cock has been rotated clockwise a quarter turn from the orientation shown in FIG. 7. The stop cock is again oriented to prevent communication between the dispensing nozzle and the tubular cartridge. In the preferred embodiment, this is the position for the stop cock during the mixing of the materials.

FIG. 9 is a similar view to FIGS. 6, 7 and 8, except the stop cock has been rotated clockwise a quarter turn from the orientation shown in FIG. 8. In this position the stop cock allows for communication between the dispensing nozzle and the tubular cartridge, without any venting of the tubular cartridge or nozzle. In the preferred embodiment, this is the position for the stop cock for dispensing the compound material from the tubular cartridge.

FIG. 10 is cross-sectional side elevation view of the dispensing nozzle, stop cock, and tubular cartridge as they would appear when joined together. The stop cock is oriented to prevent communication between the dispensing nozzle and the tubular cartridge. In the preferred embodiment, this is the position for the stop cock prior to any combining of the materials. The fist component is shown in the dispensing nozzle, and the second component is shown in the tubular cartridge.

FIG. 11 is a similar view to FIG. 10, except the stop cock has been rotated clockwise a quarter turn. In this position the stop cock allows for communication between the dispensing nozzle and the tubular cartridge, and venting of the tubular cartridge. In the preferred embodiment, this is the position for the stop cock for combining materials. The first component is shown flowing from the dispensing nozzle into the tubular cartridge, with arrows representing the direction of movement of the first fluid component.

FIG. 12 is a similar view to FIGS. 10 and 11, except the stop cock has been rotated clockwise a quarter turn from the orientation shown in FIG. 11. The stop cock is again oriented to prevent communication between the dispensing nozzle and the tubular cartridge. In the preferred embodiment, this is the position for the stop cock during the mixing of the materials.

FIG. 13 is a similar view to FIGS. 10, 11 and 12, except the stop cock has been rotated clockwise a quarter turn from the orientation shown in FIG. 12. In this position the stop cock allows for communication between the dispensing nozzle and the tubular cartridge, without any venting of the tubular cartridge or nozzle. In the preferred embodiment, this is the position for the stop cock for dispensing the compound material from the tubular cartridge. The combined materials are shown flowing from the tubular cartridge into the dispensing nozzle with arrows representing the direction of movement of the fluid combined materials.

FIG. 14 is a detail view of the tubular surface port. The tubular surface view is shown attached to a concrete structure by surface adhesive and aligned with a crack in the concrete structure. The filler material is shown injected into the crack.

DESCRIPTION OF THE PREFERRED EMBODIMENT

As shown in FIGS. 10, 11 12 and 13, the present invention consists of a method of separately storing a plurality of components 1 and 2 of a multi-component fluid material in a upstream compartment 3 and a downstream compartment 4, combining them in the downstream compartment 4 while allowing venting to an outside atmosphere 5, and then moving the combined material 6 from the downstream compartment 4 to the upstream compartment 3.

The method of the present invention involves: storing a first component 1 of the multi-component material in the upstream compartment 3, and storing a second component 2 of the multi-component material in the downstream compartment 4 with a rotary stop cock 7 connecting the upstream compartment 3 to the downstream compartment 4 to form a dispensing apparatus 8, the rotary stop cock 7 having a stem 9 and a body 10, with the stem 9 being in a first selected orientation with respect to the body 10, such that the first component 1 in the upstream compartment 3 cannot pass through the stop cock 7 to the downstream compartment 4, and a second component 2 in the downstream compartment 4 cannot pass through the stop cock 7 to the upstream compartment 3; turning the stem 9 of the stop cock 7 to a second selected radial orientation with respect to the body 10 of the stop cock 7, such that a first conduit 11 in the stem 9 of the stop cock 7 in conjunction with a first passage 12 and a second passage 13 in the body 10 of the stop cock 7 creates a communicating passage between the downstream compartment 4 and the upstream compartment 3 and a second conduit 14 in the stem 9 of the stop cock 7 in conjunction with the second passage 13 in the body 10 of the stop cock 7 establishes a vent between said downstream compartment 4 and said atmosphere 5; moving the first component 1 of the material from the upstream compartment 3 to the downstream compartment 4 to create the combined material 6; mixing the combined first and second components 1 and 2 together; turning the stem 9 of the stop cock 7 to a fourth selected radial orientation with respect to the body 10 of the stop cock 7, such that a first conduit 11 in the stem 9 of the stop cock 7 in conjunction with a first passage 12 and a second passage 13 in the body 10 of the stop cock 7 creates a communicating passage between the downstream compartment 4 and the upstream compartment 3, while the outside atmosphere 5 is prevented from entering either the downstream compartment 4 or upstream compartment 3 via the second conduit 14 in the stem 9 of the stop cock 7; moving the combined material 6 from the downstream compartment 4 to the upstream compartment 3.

As is shown in FIG. 12, furthermore, in the present invention immediately following the moving of the first component 1 from the upstream compartment 3 to the downstream compartment 4 to create the combined material 6, the stem 9 of the stop cock 7 is turned to a third selected radial orientation with respect to the body 10 of the stop cock 7, such that the combined material 6 in the downstream compartment 4 cannot pass through the stop cock 7 to the upstream compartment 3, while the outside atmosphere 5 is prevented from entering the downstream compartment 4 via the second conduit 14 in the stem 9 of the stop cock 7.

As is shown in FIG. 14, in the present invention, after the combined material 6 is moved from the downstream compartment 4 to the upstream compartment 3 the combined material 6 is injected into a crack 15 in a masonry structure 16 to repair the masonry structure 16.

As is shown in FIGS. 6, 7, 8 and 9, the present invention also consist of a stop cock 7 having: a body 10 and a stem 9, wherein the stem 9 is rotatably mounted in the body 10, and the body 10 includes a hollow shaft 17 extending axially therethrough, the shaft 17 having an interior wall 18 , the body 10 also including a first passage 12 and a second passage 13 intersecting with the shaft 17, the first passage 12 forming a first port 19 in the interior wall 18 of the shaft 17, the second passage 13 forming a separate, second port 20 in the interior wall 18 of the shaft 17; the stem 9 being formed to be rotatably received in the hollow shaft 17 of the body 10, with the stem 9 having an outer surface 21, part of which is formed as a side wall 22 that corresponds to the interior wall 18 of the hollow shaft 17 to create a tight fit between the stem 9 and the body 10, the stem 9 being formed with a first conduit 11 having first and second transmission exits 23 and 24 in the side wall 22 of the stem 9, the stem 9 also being formed with a second, separate conduit 14 having first and second venting exits 25 and 26, with the first venting exit 25 being formed in the outer surface 21 of the stem 9 and the second venting exit 26 being formed in the side wall 22 of the stem 9, and when the stem 9 and the body 10 are in a first particular orientation, the first transmission exit 23 of the first conduit. 11 is blocked by the interior wall 18 of the hollow shaft 17 of the body 10 and the second transmission exit 23 of the first conduit 11 is blocked by the interior wall 18 of the hollow shaft 17 of the body 10, and when the stem 9 and the body 10 are in a second particular orientation, the first transmission exit 23 of the first conduit 11 communicates with the first port 19 of the first passage 12 and the second transmission exit 23 of the first conduit 11 communicates with the second port 20 of the second passage 13 in the body 10 and the second venting exit 26 of the second conduit 14 communicates with the second port 20 of the second passage 13 in the body 10 and the first venting exit 25 forms a vent to an outside atmosphere 5, and when the stem 9 and the body 10 are in a fourth particular orientation, the second transmission exit 23 of the first conduit 11 communicates with the first port 19 of the first passage 12 and the first transmission exit 23 of the first conduit 11 communicates with the second port 20 for the second passage 13 in the body 10.

As is shown in FIG. 9, furthermore, in a preferred embodiment of the present invention, when the stem 9 and the body 10 are in a fourth particular orientation the second conduit 14 does not allow venting to the outside atmosphere 5 from either the first or second passages 12 and 13 in the body 10 of the stop cock 7, because the second venting exit 26 does not communicate with either the first or second passages 12 and 13 in the body 10, but is closed by the interior wall 18 of the shaft 17 of the body 10.

As is shown best in FIGS. 4A–4C and 5A–5D, furthermore, in a preferred embodiment of the present invention, when the stem 9 of the stop cock 7 is moved from the first particular orientation, and then to the second particular orientation, and then to the third particular orientation and then to the fourth particular orientation in that order, it is moved by rotating the stem 9 of the stop cock 7 in a single direction.

The present invention provides a rotary stop cock 7 that in a first selected position can separate a plurality of compartments 3 and 4, in a second selected position can allow for the flow of material from one or more upstream compartments 3 into one or more downstream compartments 4, while also allowing air to vent from the downstream compartments 4 through the stop cock 7 and out to the atmosphere 5, and in a fourth selected position can allow for the flow of material from what was the downstream compartments 4 to what was the one or more upstream compartments 3 without venting any of the compartments 3 and 4.

As is shown in FIG. 1, in the preferred use of the present invention, the stop cock 7 connects a dispensing nozzle 27 to a tubular cartridge 28. In the above description, the upstream compartment 3 is a single compartment dispensing nozzle 27 and the downstream compartment 4 is a single compartment tubular cartridge 28.

As is shown in FIG. 10, in the preferred use of the present invention, a first component 1 of a two component filler material is stored in the dispensing nozzle 27, and a second component 2 of the two-component filler material is stored in the tubular cartridge 28. During storage, the stop cock 7, in a first position, prevents the mixing of the components 1 and 2. Then, just before the filler compound 6 is ready to be used, the stop cock 7 is rotated and the components 1 and 2 are allowed to combine in the tubular cartridge 28. The components 1 and 2 are mixed with the stop cock 7 in a third closed position, and when they are ready to be discharged, the stop cock 7 is turned to a fourth position and the filler compound 6 is discharged from the cartridge through the stop cock 7 and the dispensing nozzle 27.

In accordance with the present invention, a stop cock 7 is formed of two primary elements, namely a body 10 and a stem 9. The stem 9 is rotatably mounted in the body 10.

In the preferred embodiment, the body 10 is designed to be formed by molding. The material of which the stem 9 is made must be compatible with the fluid/materials to which it is exposed and preferably is suitable for molding. The body 10 is preferably made from polypropylene. The dispensing nozzle 27 is also preferably made from polypropylene.

As is shown in FIGS. 6, 7, 8 and 9, the body 10 includes a hollow shaft 17 extending axially therethrough. The shaft 17 has an interior wall 18. The shaft 17 is primarily cylindrical in the preferred invention with a slight taper. The body 10 also includes a plurality of passages 12 and 13 intersecting with the shaft 17. In the preferred embodiment the passages 12 and 13 extend transversely though the body 10, substantially at right angles to the shaft 17. In the preferred embodiment, there are only two passages 12 and 13 and the passages 12 and 13 are disposed on opposed sides of the shaft 17. They are disposed 180 degrees angularly around the shaft 17 from each other.

As is shown in FIG. 6, in the preferred embodiment, the first passage 12, for most of its length, is formed as a large cylindrical bore. The portion of the first passage 12 having a large cylindrical bore—the main portion 29 of the first passage 12—has a first axis 30. As the first passage 12 approaches the shaft 17, it becomes constricted and remains constricted until if forms a first port 19 in the interior wall 18 of the shaft 17.

In the preferred embodiment, this constricted portion 31 of the first passage 12 is also a tubular bore and has a smaller diameter than the main portion 29. In the preferred embodiment, this constricted portion 31 of the first passage 12 also has an axis 32; however, its axis 32 lies parallel to but offset from the first axis 30 of the main portion 29 of the first passage 12.

As is shown in FIG. 6, in the preferred embodiment, the second passage 13, for its entire length, is formed as a large cylindrical bore. The second passage 13 opens into the shaft 17 of the stem 9 at a second port 20 in the interior wall 18 of the shaft 17. The second passage 13 has its own axis 33. In the preferred embodiment the axis 30 of the main portion 29 of the first passage 12 and the axis 33 of the second passage 13 are parallel and aligned.

The interior compartment 3 of the preferred dispensing nozzle 27 communicates with the stop cock 7 by means of the first passage 12 and the interior compartment 4 of the preferred tubular cartridge 28 communicates with the stop cock 7 by means of the second passage 13.

As is shown in FIG. 3, in the preferred embodiment, the connection end 34 of the dispensing nozzle 27 is formed with an exterior thread 35. This exterior thread 35 mates with an interior thread 36 in the first passage 12 of the body 10 of the stop cock 7. Preferably, an annular washer 37 helps seal the connection between the dispensing nozzle 27 and the stop cock 7. In the preferred embodiment, the dispensing nozzle 27 is formed with an exterior, annular shoulder 38 above the thread 35 to assist the assembler and improve the seal. When the dispensing nozzle 27 is sufficiently threaded into the body 10 of the stop cock 7 at the first passage 12, the annular shoulder 38 contacts the body 10 of the stop cock 7.

As is shown in FIG. 3, in the preferred embodiment, the dispensing outlet 39 of the tubular cartridge 28 is formed with an interior thread 40. This interior thread 40 mates with an exterior thread 41 on the body 10 surrounding the second passage 13.

The stem 9 is formed so that it may be easily molded, and simply and quickly inserted into the body 10 and locked therein without the need for additional locking elements. The material of which the stem 9 is made must be compatible with the fluid/materials to which it is exposed and preferably is suitable for molding. In the preferred embodiment, the stem 9 is made from nylon.

As is shown in FIGS. 4A, 4B, and 4C, in the preferred embodiment, the stem 9 is formed with a first end wall 42, a locking shoulder 43, an annular groove 44 just below the shoulder 43, a primarily cylindrical main section 45 having a slight taper, a second annular grove 46, a capping shoulder 47 and a handle 48 above the capping shoulder 47.

As is shown in FIGS. 6, 7, 8 and 9, the main section 45 of the stem 9 fits within and corresponds to the interior wall 18 of the shaft 17 in the body 10. The main section 45 is primarily cylindrical, but it has a slight taper. The main section 45 is defined by a side wall 22 that is dimensionally just slightly larger than the corresponding sections of the interior wall 18 of the shaft 17 of the body 10 when it is fully inserted in the body 10 so that a tight fit is formed between the stem 9 and the body 10, sealing the stop cock 7. The stem 9 has a main axis 49 that lies substantially parallel to the side wall 22 of the main section 45.

In the preferred embodiment, the locking shoulder 43 is formed as a frusto-connical, annular shoulder at the end of the stem 9 opposed from the handle 48, with the rim of the shoulder 43 being of a larger diameter than that of the end of the shaft 17 in the body 10, such that when the locking shoulder 43 is pushed through the shaft 17 of the body 10, during assembly, the shaft 17 deforms to allow the locking shoulder 43 to pass all the way through, but then returns to its original shape to prevent the stem 9 from being withdrawn from the body 10.

As is shown in FIGS. 6, 7, 8 and 9, the stem 9 is formed with a first conduit 11. In the preferred embodiment, this first conduit 11 is a cylindrical bore. In the preferred embodiment, the first conduit 11 runs transversely to the axis 49 of the stem 9 with first and second transmission exits 23 and 24 in the side wall 22 of the stem 9.

The first conduit 11 is axially positioned on the stem 9 at an elevation where its first transmission exit 23 can communicate with the first port 19 of the constricted portion 31 of the first passage 12, when the stem 9 and the body 10 are in a particular radial orientation—the second position. When the first transmission exit 23 of the first conduit 11 is in communication with the first port 19 of the constricted portion 31 of the first passage 12, the second transmission exit 23 of the first conduit 11 communicates with the second port 20 for the second passage 13 in the body 10.

Also, the first bore or first conduit 11 is axially positioned on the stem 9 at an elevation where its second transmission exit 23 can also communicate with the first port 19 of the constricted portion 31 of the first passage 12, when the stem 9 and the body 10 are in a particular radial orientation—the fourth position. When the second transmission exit 23 of the first conduit 11 is in communication with the first port 19 of the constricted portion 31 of the first passage 12, the first transmission exit 23 of the first conduit 11 communicates with the second port 20 for the second passage 13 in the body 10.

A second conduit 14 is formed in the stem 9. In the preferred embodiment, the second conduit 14 is a completely separate conduit from the first conduit 11. The second conduit 14 is formed with a first venting exit 25 at the first end wall 42 of the stem 9 and with a second venting exit 26 at the side wall 22 of the stem 9. The second venting exit 26 at the side wall 22 of the stem 9 is positioned so that when it communicates with the second port 20 for the second passage 13, the second transmission exit of the first conduit 11 is in communication with the second port 20 of the second passage 13 as well. As is shown in FIG. 5D, preferably the second venting exit 26 at the side wall 22 of the stem 9 is axially aligned on the side wall 22 with the second transmission exit 23 of the first conduit 11 in the stem 9.

As is shown in FIG. 11, this positioning of the second venting exit 26 of the second conduit 14 with respect to the second transmission exit 23 of the first conduit 11 allows atmosphere in the tubular cartridge 28 to escape from the cartridge through the second conduit 14 of the stop cock 7 when the first component 1 from the dispensing nozzle 27 is passing into the tubular cartridge 28 from the first conduit 11 in the stop cock 7.

As is shown in FIGS. 7 and 11, in the preferred embodiment, the second conduit 14 lies in the interior of the stem 9, but the second conduit 14 could also be formed as a channel in the side wall 22 of main portion 29 of the stem 9. Also vents could be provided in the body 10 of the stop cock 7, rather than having the venting conduit have a first venting exit 25 at the end wall 42. These vents could communicate between the atmosphere 5 and the tubular cartridge 28, when the second venting exit 26 of the second conduit 14 is in communication with the second port 20 of the second passage 13.

The exits 23, 24, 25 and 26 of the first and second conduits 11 and 14 can be located in a number of different locations, so long as when the first transmission exit 23 of the first conduit 11 is aligned with the first port 19 of the first passage 12, and thereby the second transmission exit 23 of the first conduit 11 is aligned with the second port 20 of the second passage 13, then the first venting exit 25 of the second conduit 14 opens on the outer atmosphere 5 and the second venting exit 26 opens to the second port 20 of the second passage 13, but, when the second transmission exit 23 of the first conduit 11 is aligned with the first port 19 of the first passage 12, and thereby the first transmission exit 23 of the first conduit 11 is aligned with the second port 20 of the second passage 13, the second conduit 14 does not allow atmosphere into either the first or second passages 12 and 13 in the body 10 of the stop cock 7, because the second venting exit 26 does not communicate with either the first or second passages 12 and 13 in the body 10, but is closed by the interior wall 18 of the shaft 17 of the body 10.

As is shown in FIGS. 9 and 13, in the preferred embodiment, the second conduit 14 does not communicate with the first passage 12 when the second transmission exit 23 of the first conduit 11 communicates with first port 19 of the first passage 12, because the first port 19 of the first passage 12 has been formed to only be able to communicate with either the first or second transmission exits 23 and 24 of the first conduit 11. In the preferred embodiment, this accomplished by making the first port 19 for the first passage 12 the same size as the second transmission exit 23 of the first conduit 11 and positioning the first port 19 of the first passage 12 so that it aligns with the second transmission exit 23 of the first conduit 11 when the stem 9 and the body 10 of the stop cock 7 are in the fourth selected radial orientation.

As is shown best in FIGS. 7 and 10, in the preferred embodiment, the second passage 13 is formed as one discrete passage with one port, but it is possible that the second passage 13 could comprise a number of channels, bores or passages that either shared or had their own ports at the interior shaft 17 of the body 10.

As is shown in FIG. 11, in the preferred embodiment, when the first component 1 from the dispensing nozzle 27 is being transferred to the tubular cartridge 28, the second passage 13 of the stop cock 7 body 10 serves the dual role of carrying the first component 1 from the dispensing nozzle 27 into the tubular cartridge 28 and allowing atmosphere to escape from the tubular cartridge 28 by means of the second conduit 14. These functions could be accomplished in two or more different second passages.

As is shown in FIG. 1, preferably, the handle formed on the stem 9 is enlarged with respect to the stem 9 and is large enough that the stem 9 may be rotated by hand.

As is shown in FIGS. 1, 2A and 2B, generally, the tubular cartridge 28 is formed with an end outlet 50 as wide as the tubular cartridge 28 at the end opposed from the dispensing outlet 39. The narrow dispensing outlet 39 is formed to receive the stop cock 7. The end outlet 50 is formed to receive a wiper 51 that closes off the tubular cartridge 28.

As is shown in FIGS. 1 and 6, in the preferred embodiment, the dispensing end 52 of the dispensing nozzle 27 is provided on its exterior surface with barbs 53 so that it is adapted to receive a flexible conduit 54.

In the preferred embodiment, the dispensing end 52 of the dispensing nozzle 27 is also formed with a portion of its interior being of a suitable size for being inserted over the inlet end 55 of a tubular surface port 56. If this is desired, the barbed portion of the dispensing end 52 can be cut from the dispensing nozzle 27 just prior to the discharge of the combined material 6 from the tubular cartridge 28. As shown in FIGS. 1 and 6, a weakening groove 56a is preferably formed in the dispensing nozzle 27 to show where dispensing end 52 can be broken from the dispensing nozzle 27 to accommodate this.

As is shown in FIGS. 1, 2A, 10 and 11, in the preferred method of operation, when the user is ready to combine and use the first and second components 1 and 2, the user removes the plug 57 from the cartridge 28, unsealing the dispensing outlet 39 of the preferred tubular cartridge 28. The user then attaches the stop cock 7 and dispensing nozzle 27 to the tubular cartridge 28 by screwing the stop cock 7 onto the dispensing outlet 39 of the cartridge 28.

As is shown in FIG. 11, the user then turns the stop cock 7 a quarter turn to the second selected position. This positions the first conduit 11 between the dispensing nozzle 27 and the tubular cartridge 28 and moves the venting or second conduit 14 to allow for venting the cartridge 28 to the atmosphere 5. The user then removes the cap 58 from the outlet 52 of the dispensing nozzle 27 and the first component 1 in the dispensing nozzle 27 then flows into the tubular cartridge 28, while atmosphere in the cartridge 28 vents to the outside 5.

As is shown in FIG. 12, after the first component 1 has drained from the dispensing nozzle 27 into the cartridge 28, the cap 58 for the dispensing nozzle 27 is replaced on the outlet end 52 of the dispensing nozzle 27 and the stem 9 of the stop cock 7 is turned another quarter turn to the third selected position so that once again there is no communication between the dispensing nozzle 27 and the cartridge 28 and also so that there is no venting of the cartridge 28 to the atmosphere 5.

The user can then gently shake the cartridge 28, and with it the nozzle 27, for a selected period of time, until the first and second components 1 and 2 are thoroughly mixed.

When the user has mixed the first and second components 1 and 2 sufficiently, the dispensing nozzle 27 and the tubular cartridge 28 are loaded into a ratchet or caulking gun with the ram head of the ratchet gun pressing against the wiper 51 of the tubular cartridge 28.

As is shown in FIG. 13, the user then removes the cap 58 from the outlet end 52 of the dispensing nozzle 27. If the dispensing nozzle 27 needs to be hooked up to an extension hose/flexible conduit 54 or a tubular surface port 56, this is also done at this time. See FIGS. 1 and 2A, in the preferred embodiment of the dispensing nozzle 27, the barbed end of the dispensing nozzle 27 can be cut away from the dispensing nozzle 27 at a selected point where the dispensing nozzle 27 has a particular inner diameter so that it can fit closely over the inlet end 55 of a tubular surface port 56.

If an extension hose 54 is used to connect the dispensing nozzle 27 to the tubular surface port 56, as is shown in FIGS. 1, 2A and 14, it is preferable to use quick release intermediate connector 59 for attaching the extension hose 54 to the tubular surface ports 56. The tubular surface port 56 shown in the attached drawings is a two-part component that can be closed by the user to prevent the escape of the filler material 6. As is shown in FIG. 14, the tubular surface port 56 is shown bonded to the masonry surface 16 over the crack 15 to be repaired/filled. The port is bonded by a surface adhesive 60, and will be removed after the crack 15 has been filled and the filler material 6 has cured.

As is shown in FIG. 13, when the user is ready to discharge the filler material 6, the user then turns the stop cock 7 a quarter turn to the fourth selected position. This positions the first conduit 11 between the dispensing nozzle 27 and the tubular cartridge 28, while preventing the venting or second conduit 14 from communicating to the dispensing nozzle 27.

The filling compound can then be dispensed from the cartridge 28 into the dispensing nozzle 27, out the outlet end 52 of the dispensing nozzle 27 and eventually into the surface crack 15 to be repaired.

The ratchet gun is then actuated to extrude the filler material 6 in the desired location. As the wiper 51 travels through the tubular cartridge 28 it pushes the combined material 6 out of the cartridge 28.

As is shown in the drawings and best in drawings 10, 11, 12, and 13, the stem 9 and the body of the stop cock 7 can be formed with identifying indicia to inform the user as to the selected radial orientation of the stem 9 with respect to the body 10.

The invention is not limited to the specific form shown, but includes all forms within the definition of the following claims.

We claim:

1. A stop cock comprising:
   a. a body and a stem, wherein the stem is rotatably mounted in the body, and the body includes a hollow shaft extending axially therethrough, the shaft having an interior wall, the body also including first and second passages intersecting with the shaft, the first passage forming a first port in the interior wall of the shaft, the second passage forming a separate, second port in the interior wall of the shaft;

b. the stem being formed to be rotatably received in the hollow shaft of the body, with the stem having an outer surface, part of which being formed as a side wall that corresponds to the interior wall of the hollow shaft to create a tight fit between the stem and the body, the stem being formed with a first conduit having first and second transmission exits in the side wall of the stem, the stem also being formed with a second, separate conduit having first and second venting exits, with the first venting exit being formed in the outer surface of the stem and the second venting exit being formed in the side wall of the stem, and when the stem and the body are in a first particular orientation, the first transmission exit of the first conduit is blocked by the interior wall of the hollow shaft of the body and the second transmission exit of the first conduit is blocked by the interior wall of the hollow shaft of the body, and when the stem and the body are in a second particular orientation, the first transmission exit of the first conduit communicates with the first port of the first passage and the second transmission exit of the first conduit communicates with the second port of the second passage in the body and the second venting exit of the second conduit communicates with the second port of the second passage in the body and the first venting exit forms a vent to an outside atmosphere, and when the stem and the body are in a fourth particular orientation, the second transmission exit of the first conduit communicates with the first port of the first passage and the first transmission exit of the first conduit communicates with the second port for the second passage in the body.

2. The stop cock of claim 1, wherein when the stem and the body are in the fourth particular orientation the second conduit does not allow venting to the outside atmosphere from either the first or second passages in the body of the stop cock, because the second venting exit does not communicate with either the first or second passages in the body, but is closed by the wall of the interior shaft of the body.

3. The stop cock of the claim 2, wherein the stem of the stop cock is moved from the first particular orientation, and then to the second particular orientation, and then to a third particular orientation and then to the fourth particular orientation in that order by rotating the stem of the stop cock a single direction.

* * * * *